United States Patent [19]
Arditty et al.

[11] Patent Number: 4,592,030
[45] Date of Patent: May 27, 1986

[54] METHOD OF SEISMIC EXPLORATION BY ACOUSTIC WELL LOGGING

[75] Inventors: Patricia Arditty, Le Chesnay; Georges Arens, Croissy sur Seine; Philippe Staron, Mennecy, all of France

[73] Assignee: Societe Nationale Elf Aquitaine, Division Propriete Industrielle Tour Elf, Paris, France

[21] Appl. No.: 426,238

[22] Filed: Sep. 28, 1982

[30] Foreign Application Priority Data

Oct. 5, 1981 [FR] France .................. 81 18672

[51] Int. Cl.⁴ .................................. G01V 1/40
[52] U.S. Cl. ........................... 367/27; 367/29
[58] Field of Search ........... 367/25, 27, 31, 34, 367/50, 59, 14, 40, 38, 28, 29; 364/422

[56] References Cited

U.S. PATENT DOCUMENTS

| | | | |
|---|---|---|---|
| 3,302,166 | 1/1967 | Zemanek, Jr. | 367/27 |
| 3,334,329 | 8/1967 | Fons et al. | 367/27 |
| 3,362,011 | 4/1968 | Zemanek, Jr. | 340/860 |
| 4,210,966 | 6/1980 | Ingram | 367/20 |
| 4,460,986 | 7/1984 | Millouet et al. | 367/27 |

FOREIGN PATENT DOCUMENTS

| | | |
|---|---|---|
| 1432012 | 2/1966 | France . |
| 2383455 | 3/1978 | France . |
| 2431710 | 2/1980 | France . |
| 2071847A | 1/1981 | United Kingdom . |

OTHER PUBLICATIONS

F. Aron et al., "Formation Compressional and Shear Interval-Transit-Time Logging by Means of Long Spacings and Digital Techniques", Technical Paper presented at 53rd Annual Fall Technical Conf. and Exhibition of SPE, Oct. 1-3, (1978), pp. 1-11.

*Primary Examiner*—Salvatore Cangialosi
*Assistant Examiner*—Ian J. Lobo
*Attorney, Agent, or Firm*—Holman & Stern

[57] ABSTRACT

The invention relates to a method of seismic exploration by acoustic well logging.

It is characterized in that in the traces recorded corresponding to each transmitter-receiver pair, each type of wave of interest is identified using the results of a velocity analysis, then the time of appearance in the trace of a characteristic event of the phase of the wave of interest is determined and the velocity of the wave is deduced from this time and from the thickness of the layer of formation studied.

10 Claims, 14 Drawing Figures

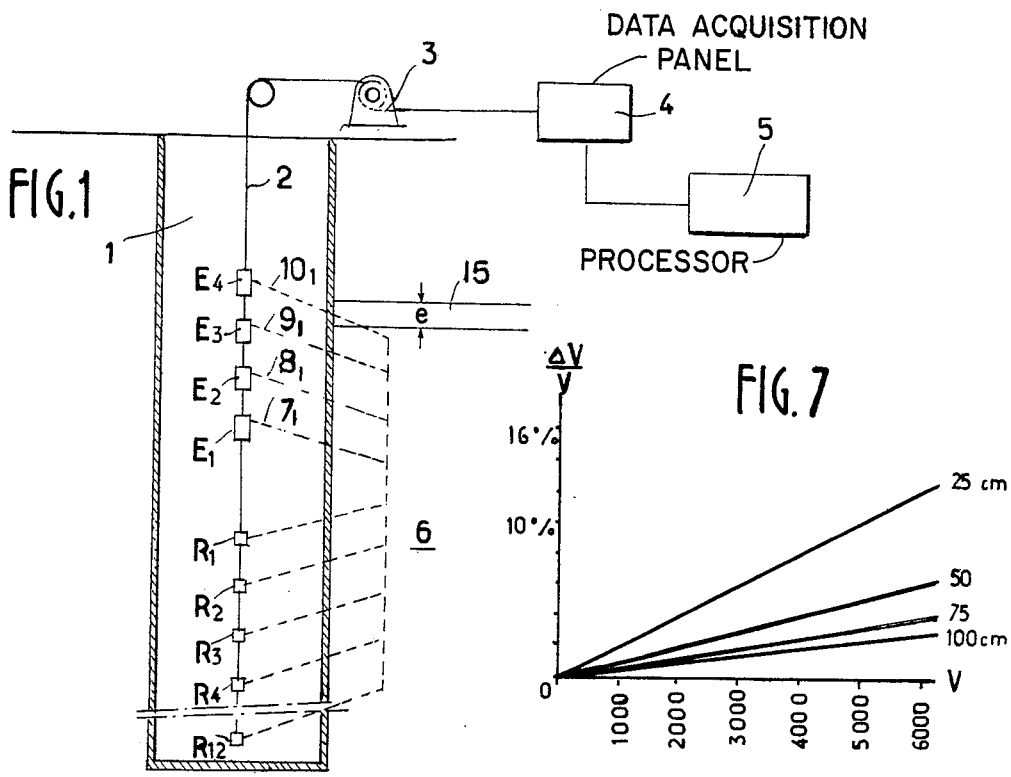
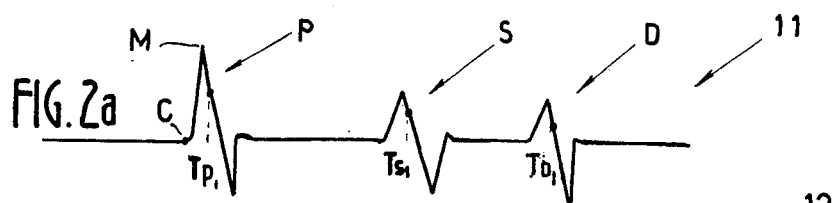
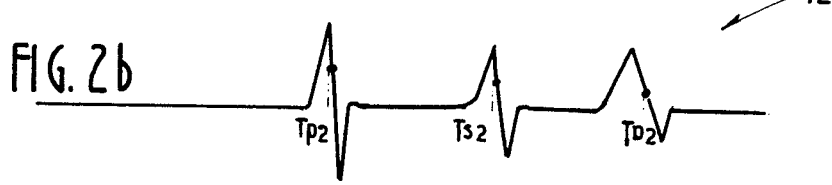
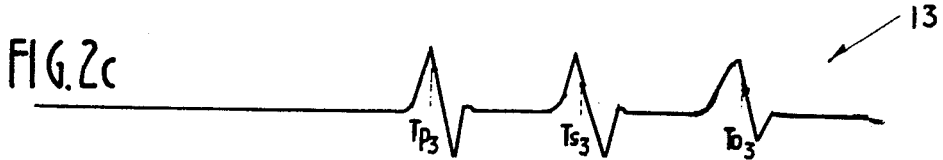
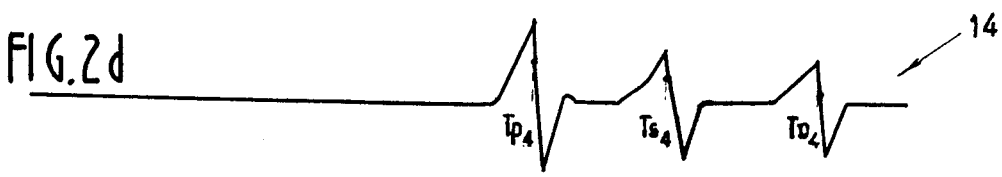

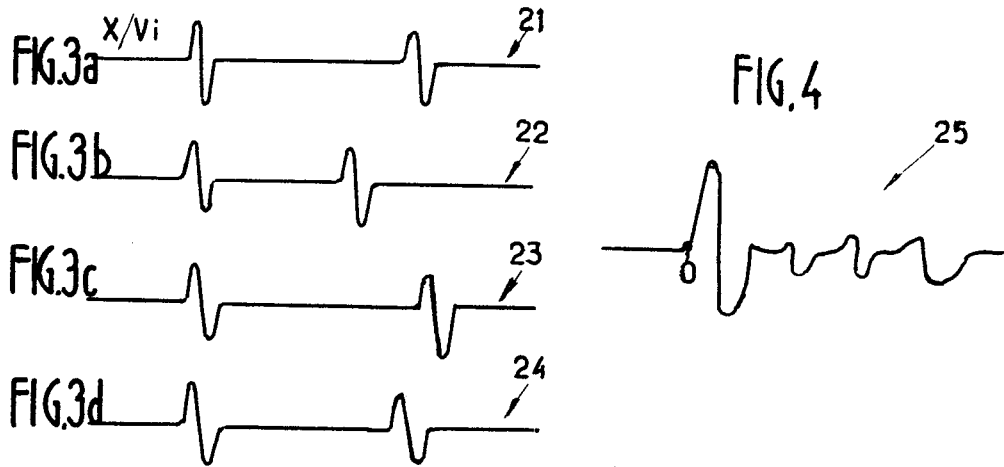
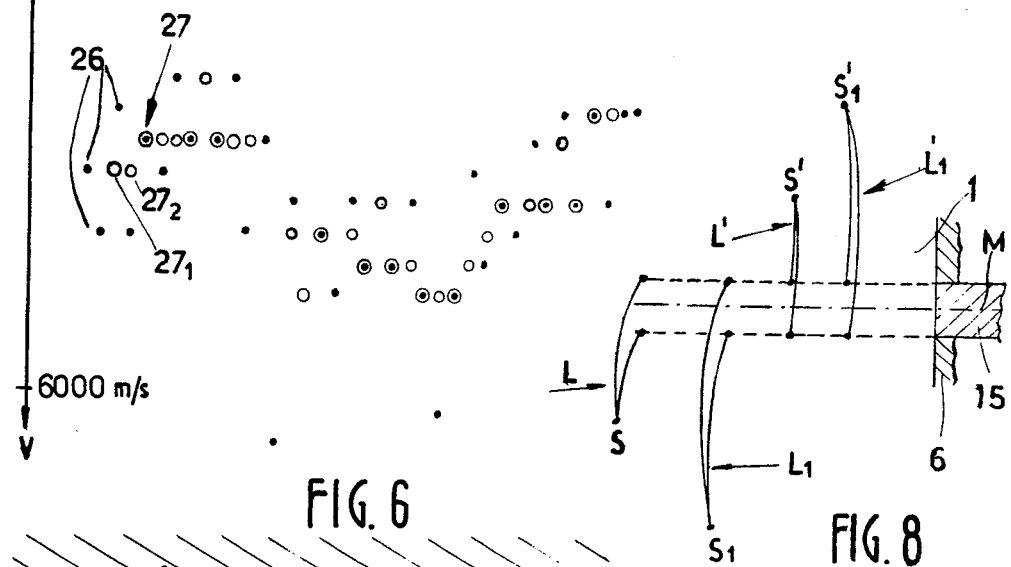
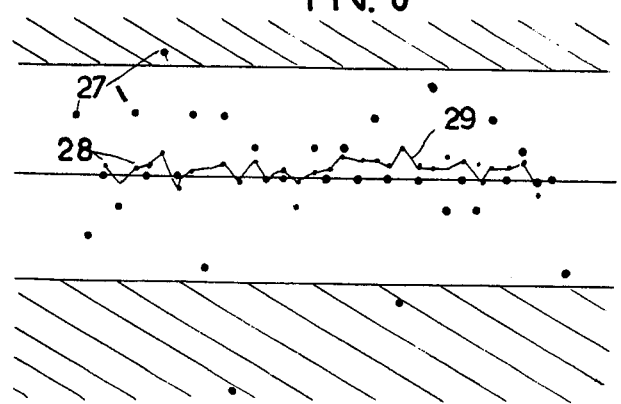

METHOD OF SEISMIC EXPLORATION BY ACOUSTIC WELL LOGGING

FIELD OF THE INVENTION

The present invention relates to a method of seismic exploration by acoustic well logging of geologic formations penetrated by a drilled well.

PRIOR ART

The acoustic well logging techniques are numerous and well known. In particular, they enable the measurement of velocities of acoustic waves to gather the information relevant particularly to the nature and to the porosity of the geologic formations surrounding the drilled well. For a long time, only the velocity of the compressional waves was measured. However, other characteristics of acoustic waves such as velocities of shear wave and of the mud wave or direct wave and/or the attenuations of these same waves are useful to complete the information on said formations.

One known acoustic well logging technique consists of using an electronic system which determines the instant when the amplitude of the signal received on one or several receivers exceeds a certain threshold, which instant corresponds to the arrival at the receiver of the wave emitted by a transmitter located at a certain distance from said receiver.

A threshold acoustic well logging tool consisting of a single transmitter and a single receiver had the serious drawback of limiting the detection to the compressional wave which is generally the first to reach the receiver. For this, the value of the threshold, sufficiently high so that the other interfering acoustic waves are not detected, is predetermined.

The drawbacks related to such a method being too important, other methods and devices for well logging have been proposed which enable the measurement of other parameters of the acoustic wave, and also eliminate the interfering transit times in the drilling mud to the wall of the drilling well. Such devices and methods are described in U.S. Pat. No. 3.302.166 and French Pat. No. 1.432.012. The devices described in these patents consist of four receivers coupled two by two, the pairs of receivers being arranged on each side of a central transmitter. By combining the signals recorded on the receivers a diagram of the acoustic velocity in the formations as a function of the depth at which the tool is located, is obtained. Since the positioning adjustment of the receiver pairs at very accurate depths is difficult to realize during the emissions of the transmitter and the measurement of other parameters, such as the shape of the received wave, its amplitude, etc . . . cannot be obtained by the means described in these patents, a new device and a new method of well logging has been proposed, described, for example in U.S. Pat. No. 4,210,966. The method described in this patent consists essentially of transmitting a signal from a transmitter located at the lower end of the tool and of recording the signals received on several receivers arranged on a same side of the transmitter. Each of the receivers is adjusted to a threshold value from which the various waves being propagated in the formations are received and recorded. The various traces recorded in the receivers are combined with one another by means of a four fold correlation, so that the correlation values obtained are related to the values of the parameters of the acoustic wave. Then among these various values, those are selected which produce the best correlation, for example, those relating to an energy peak, or a weighted energy peak. After which, for each series of traces, the characteristic value of the series is determined. This threshold method is applied to the compressional wave, the first received on the receivers, then if necessary to the shear wave starting from the hypothesis that the transit time of the shear wave in the formations is between 1.6 and $2\times$ the transit time the compressional wave which has passed through said formations. Consequently, the velocity of the compressional wave calculated as previously and according to the threshold method is used, to determine, by means of another four fold correlation, the velocity of this shear wave.

The major drawback of such a method is, on the one hand, the one which is related to the threshold method, mentioned above, and on the other hand, to calculate the velocity of the shear wave from that of the compressional wave calculated previously. The risks of errors which can spoil such a measurement of the velocity of the shear wave can then be imagined. In addition, the other types of waves such as, for example, the mud waves and other parameters of acoustic waves cannot be measured. Finally, the relatively high speed of tool motion (20 m/min) in the drilled well does not allow obtaining information on very small thicknesses of formations. In fact, with a shot or emission every 100 ms, information on layers of formation of 3.3 cm are obtained.

In French Patent Application No. 78 21 226 of July 18, 1978, and published under No. 2,431.710, there is described a new acoustic well logging method by means of which all the waves able to propagate in the geologic formations surrounding the drilled well can be measured as well as their principal characteristics. This method is characterised in that it consists for each emission of recording all the signals received on at least one of the receivers, of identifying at the instant of emission and for each recording, the respective positions of the transmitter-receiver pair which has given rise to said recording, gathering all the recordings in pairs so that in a given pair, the two acoustic paths corresponding to the two recording of said pair present on the one hand a common end located on the same side in the drilling well and, on the other hand, a non common part located on the geologic layer of interest, and calculating the intercorrelation function for each pair of recordings so as to obtain maxima peaks corresponding to the various waves received at the receivers. This permitted, while eliminating propagation noises, to emphasize the maxima of all the waves received and being propagated in the formations around the drilling well. Thus, with respect to the method of U.S. Pat. No. 4,210,966, the advantage was obtained of being able to measure the velocities of all the received waves on the receivers and to reduce the intercorrelation processing to a two fold correlation while obtaining a more accurate and more representative velocity diagram of the geologic layers explored.

However the drawback of the exact positioning of the receivers and of the transmitters to a precise depth was not eliminated. Moreover, due to the fact of the processing by correlation it was not possible to have a redundancy of information which permits particularly the elimination of such a wave received at the receivers.

It is an object of the present invention to provide a new method for processing signals received on the receivers from which the principal waves such as the compressional wave, shear wave, mud wave are measured, the processing also enabling the measurement of other parameters: amplitude, attenuation and secondary waves such as Raleigh waves.

The processing uses a velocity analysis technique known in itself in seismic prospecting but generally very rarely used in acoustic well logging.

GENERAL DESCRIPTION OF THE INVENTION

Accordingly, the method of processing according to the invention is of the type consisting of emitting and receiving acoustic waves by emitting and receiving means arranged in said well and defining between them at least two acoustic paths of different lengths, recording on each emission the full waveform, of the signals received by at least one of the receiving means and identifying at the instant of the emission and for each recording, the respective positions of the transmitter-receiver pair which has given rise to the recorded trace and carrying out on at least a plurality of said traces a velocity analysis to determine an approximate value of the transit time of each type of wave being propagated in said formations. On each trace is identified the approximate values of the time thus obtained so as to locate the different types of waves which appear in the traces, then, for each type of wave of interest, an event characterictic of the phase of the wave of interest is selected, and the time corresponding to the appearance of this characteristic element in said trace is determined so as to deduce the actual velocity of propagation of this wave in the layers of the geologic formations located between the emitter-receiver pair which has given rise to said trace. All the traces are gathered in pairs so that, in a given pair, the two acoustic paths corresponding to the two traces of said pair show, on the one hand, a common end located on the same side in the drilled well and, on the other hand, a non common part located in front of each geologic layer in which there is an interest. In each pair of traces the difference of the times of arrival of the characteristic elements selected for each type of wave of interest is measured and finally, by means of this difference in time and the thickness of said geologic layer the velocity of propagation of each wave of interest in this layer is computed.

Another advantage of the present invention lies on the fact that besides the recording of all the signals received at the receivers, it is possible to check the compatibility of the recorded waves in the traces. In fact, it is possible to verify if in consecutive or close-by traces, waves of the same rank are or are not of the same type.

BRIEF DESCRIPTION OF THE DRAWINGS

Other advantages and characteristics of the invention will emerge from reading the description below which is given purely by way of non-limiting indication, in conjunction with the accompanying drawing, in which:

FIG. 1 is a schematic sectional view of a drilling well which penetrates geologic formations and in which an acoustic logging tool is positioned;

FIGS. 2a to 2d show theoretical traces of the signals recorded in a receiver;

FIGS. 3a to 3d show schematically traces of the FIGS. 2a to 2d corrected for a value $V_i$ of the velocity;

FIG. 4 is a schematic representation of the stacked trace of the corrected traces of FIGS. 3a to 3d;

FIG. 5 is a schematic representation of the velocities V as a function of the depth in the drilling well;

FIG. 6 is a schematic representation of the velocity diagram obtained from the median points of FIG. 5;

FIG. 7 is a representation $\Delta V/V$ as a function of V for various thicknesses of layers of formations penetrated by the drilling well;

FIG. 8 is a schematic representation of a measurement carried out by means of double pairs of traces arranged symmetrically with respect to the middle plane of a geologic layer of interest.

DESCRIPTION OF PREFERRED EMBODIMENTS

The acoustic well logging tool is introduced into a drilling well 1 and comprises transmission means constituted by one or several emitters and receiving means constituted by one or several receivers aligned with the one or more emitters, the product of the number of emitter and the number of receivers being at least equal to two and preferably equal to the number of different acoustic paths that it is desired to obtain. In FIG. 1, is shown the well logging tool consisting of four emitters $E_1$ to $E_4$ and twelve receivers $R_1$ to $R_{12}$ of which only five are drawn. The well logging tool is suspended from a cable 2 pulled by a winch 3, the information and/or signals coming from the emitters and/or the receivers being brought to a panel 4 through said cable 2. The panel 4 is connected to processing means represented by the block diagram 5.

In a particular embodiment of the well logging tool, the receivers $R_1$ to $R_{12}$ are equidistant from one another In the same way, emitters $E_1$ to $E_4$ are equidistant from one another. The distances separating two consecutive emitters and/or two consecutive receivers may be of any length. In the example shown, the emitters are separated from one another by 25 cm, the distance separating the two receivers being 1 m and the speed of the tool motion in the drilled well being 6 m/min. The functions of the well logging tool are controlled from the surface. The acoustic waves emitted by the emitters $E_1$ to $E_4$ each follow an acoustic path in the geologic formation 6 surrounding the drilled well 1 before being received at the receivers $R_1$ to $R_{12}$ in the form of signals recorded on a suitable support in the form of a trace.

Thus, the acoustic wave emitted by the emitter $E_1$ follows $7_1$ when it is received at the receiver $R_1$, while the acoustic waves emitted by the other emitters $E_2$ to $E_4$ follow the paths $8_1$ to $10_1$ for reception at the receiver $R_1$. It is the same for the other receivers $R_2$ to $R_{12}$; hence, there are at least 48 different acoustic paths.

According to a feature of the invention the emitters $E_1$ to $E_4$ are fired one after the other so as to produce an acoustic wave every 100 ms, for example. The sequence formed by the four successive acoustic wave emissions will be called elementary emission sequence. The reception of these four emissions on the same receiver $R_1$ for example, will be called iso-receiver.

Thus, during an iso-receiver elementary emission sequence, the other receivers are locked, that is to say that they do not receive any signal while the selected receiver is in operation.

For more clarity, it will be assumed that the elementary emission sequence is received at the receiver $R_1$, the other receivers $R_2$ to $R_{12}$ being then locked. On the receiver $R_1$, four distinct signals which produce four distinct original traces 11 to 14, like those shown in FIGS. 2a to 2d, are received, due to a well-known suitable electronic circuit, which will not be described in detail. Each recorded original trace can be defined by the emitter-receiver pair $E_i R_j$ which gives rise to it, its offset, that is to say the emitter-receiver distance $E_i$-$R_j$ of said pair and by the depth Z of the tool in the drilled well 1. In each original trace appear several types of waves of which the nature and the particular characteristics must be determined. It may be noted that the traces 11 to 14 are shifted to the right in the figures for the reason that the emissions were carried out with an increasing offset; accordingly, the times of transit of these emissions are different and increase going on from the emitter $E_1$ to the emitter $E_4$.

The processing method according to the invention consists firstly of correcting each original trace 11 to 14 to bring it to an offset identical for all, for example equal to zero. In classical seismic practice, this is called static correction. Since the acoustic velocity of the waves being propagated in geologic formations vary between wide limits, a velocity range for the explored formations is selected. In the tests carried out, it was determined that the velocities of said waves were between 1000 m/s and 6000 m/s. In the so-corrected traces, a velocity analysis was carried out. It is of course understood that the velocity analysis described below is in no way limiting and that other velocity analyses can be used. According to the invention, for each trace, a correction is carried out by using a number N of velocity values between the limits mentioned and varying in linear step by 1/V, V being the correction velocity. In the example described, N=50 and the correction step is $$\frac{\frac{1}{1000} - \frac{1}{6000}}{50} = 1.667 \times 10^{-5},$$

which gives the following correction velocities:
$1/V_0 = 1/6000$ whence $V_0 = 6000$ m/s
$1/V_1 = 1/6000 + 1.667 \times 10^{-5}$ whence $V_1 = 5476.45$ m/s
$1/V_2 = 1/6000 + 2 \times 1.667 \times 10^{-5}$ whence $V_2 = 5010.02$ m/s
and so on up to:
$1/V_{49} = 1/6000 + 49 \times 1.667 \times 10^{-5}$ whence $V_{49} = 1000$ m/s.

According to a first method, the velocity analysis is carried out at the iso-receiver, that is to say it is carried out on the four traces obtained from the signals received at a receiver and coming from the emitters $E_1$ to $E_4$. After correction of the four traces of FIGS. 2a to 2d by 1/V, the corresponding corrected traces 21 to 24 shown in FIGS. 3a to 3d are obtained. The traces so-corrected 21 and 24 are added to form, for each $V_n$, a stacked trace 25 shown in FIG. 4. In a stacked trace, in the vicinity of the time origin, an energy maximum is obtained with respect to the close-by stacked traces; therefrom it is deduced that the velocity $V_n$ which has produced this maximum is the approximate real velocity of a certain type of wave. According to the value of the approximate real velocity within the velocity limited imposed (1000 to 6000 m/s), the nature of the wave corresponding to the approximate real velocity is deduced, taking into account preliminary studies relative to the nature of the formations penetrated by the drilled well.

From the velocity deduced from each energy maximum, and from the offset of the original traces, the approximate times of arrival of the wave defined by said energy maximum in each original trace is computed.

These approximate times are plotted on the four original traces. In the example of FIGS. 2a to 2d, the approximate times of arrival of the compressional wave P, of the shear wave S and of the direct wave or mud wave D are respectively $T_{P1}$ to $T_{P4}$, $T_{S1}$ to $T_{S4}$ and $T_{D1}$ to $T_{D4}$.

From these approximate times of arrival of the waves, one or several events characteristic of the phase of the wave which is of interest (peak, trough, zero crossing time, etc . . . ) are selected for each type of wave. For example, for the compressional wave of the trace 11, the time corresponding to the closest peak M to the time $T_P$, and the time corresponding to the trough C preceding the time $T_P$, are read. The same thing is repeated on the four traces and for each type of wave. It is also possible without difficulty to measure the amplitudes of the signal at the approximate times plotted, as well as the frequencies at these times and indeed other parameters which could be useful for the analysis of the formations explored.

The following step of the method consists of gathering the traces in pairs so that in a given pair the two acoustic paths have a common end located, neglecting the tool motion, at one end in the drilling well, and a non-common part located in front of each geologic layer of interest. In the example shown in FIGS. 2a to 2d, the gathering of the two traces 13 and 14 of FIGS. 2c and 2d corresponds to different acoustic paths $9_1$ and $10_1$ having a common end which is the receiver $R_1$ and a non common part corresponding to a layer 15 of which the thickness e is equal to the distance separating the two emitters $E_3$ and $E_4$, namely 25 cm. It is seen therefor that the gathering of the traces 11 to 14 enables the analysis of the different layers. Due to the design of the previously defined tool, layers of the formation of thickness equal to 25 cm, 50 cm, 75 cm are analysed. More exactly, the analysis can be carried out at three intervals of 25 cm, two intervals of 50 cm and one interval of 75 cm. By measuring in each pair of gathered traces the difference of the arrival times, the velocity of propagation of the waves in the layer of the formation which is of interest is computed.

Quite obviously, it is possible to make other measurements of parameters such as the amplitudes to determine therefrom the attenuations, in each type of wave. Since the paths of the waves in the formations are relatively long, it is possible to detect a variation in amplitude due to the coefficient of attenuation of the formations penetrated which it would be difficult to evaluate by prior methods using short paths imposed by the emitter-receiver distance. In fact, the measurement of attenuation is possible by the measurement of the ratio of the amplitudes of the signals between two different offset traces. This ratio is more and more significant as the offset difference is increasing.

The present invention enables, due to the large number of traces obtained, the measurement of practically all events of interest and elimination of those which would be aberrant. A simple example enables this point to be made more explicit. Suppose that in a first trace three arrivals have been recorded (P,S and D) and only two arrivals (P and D) or again four arrivals in a second trace. To avoid making differences of time or of amplitude ratios between the arrival S of the first trace and the arrival D of the second trace which are not of the same type, it is verified that the variation in velocity that is found between two arrivals relating to the same type of wave in two consecutive or very close traces, does not exceed a certain value x % which is fixed as a function of the assumed and known geologic conditions. This is called verifying the compatibility of the arrivals and enables gathering of the arrivals corresponding to the same type of wave.

The processing which has just been described for an elementary emission sequence is generalized to other elementary emission sequences which correspond to reception on the receiver $R_2$, the other receivers $R_1$ and $R_3$ to $R_{12}$ being locked. The overall processing is carried out, still for a tool consisting of four transmitters and twelve receivers, in $4 \times 12 = 48$ traces. It is seen hence that there are many more values by using intervals of 25 cm than 50 cm or 75 cm. In addition, the redundancy of information so-obtained enables the calculation of values read in different pairs of traces (different emitter-receiver pair) but which characterize the same layers of geologic formation.

The raw results of the picking on all the traces gives a large number of times and hence of velocities relating to each layer of interest, the whole of these results forming a cluster of points on which a statistical calculation is carried out to obtain as distinct a representative curve as possible corresponding to the diagram of the velocities as a function of depth.

In FIG. 5 are shown points 26 giving the velocity V as a function of the depth Z. A number Q of base points is fixed for which the median point is calculated. In the example of FIG. 5, the base number Q is equal to 5. The median point 27 is selected so as to have two points 26 situated above and two points 26 situated below. This first median point $27_1$ is the value of the median of the points 26. The second median point $27_2$ is calculated by taking Q points 26 from the second point 26. The $K^{th}$ median point $27_K$ represents the value of the median of Q points taken from the point 26 of row K, that is to say in an interval from K to Q+K, the median point $27_K$ being positioned at the median value of Z of the Q points concerned.

Then, on a base number Q', different from or equal to Q, of median points 27, a sliding average is formed in the manner described above with regard to the calculation of the sliding median. This gives in FIG. 6 mean points 28 of which the whole defines the desired diagram 29 of velocities as a function of depth.

Although the basic hypotheses of the above described processing induces errors since it does not take into account the motion of the tool on the one hand and of the effects of cavities on the other hand, it has been observed experimentally that the above-applied processing practically eliminated the uncertainties induced by these hypotheses.

The traces of the signals arriving at the receivers being constituted by digital data with a sampling rate of 5 micro-seconds (5 $\mu$s), it is necessary to carry out a correction associated with this sampling rate. FIG. 7 shows $\Delta V/V$ as a function of V in m/s for various thicknesses e of the layers and deduced from the following calculations:

$$\Delta V/V = \Delta t/t \text{ with } \Delta t = 5 \text{ } \mu s$$

and $$t = e/V \rightarrow \Delta V/V = \Delta tV/e$$

It is observed that, if the velocity V is high in a layer, $\Delta V/V$ will be large for a small e and small for a large e.

Under these conditions, mathematically oversampling by causing interpolation between samples, the mathematical oversampling can be effected by the Lagrange method or the parabolic coupling method, for example.

Throughout the description, an iso-receiver processing has been considered, but it would be possible also to carry out an iso-emitter processing, that is to say to consider the traces obtained by emission of an acoustic wave and received on all the receivers. Under these conditions, the acoustic paths would have a common end, the emitter and the non common parts equivalent to the distances separating the receivers from one another. The choice of groups of traces to form pairs will depend essentially on the thickness of the layers of the formations which are of interest.

Another possibility offered by the invention is processing on all the traces obtained by all the emissions and recorded on all the receivers. The steps described with regard to the elementary sequence will remain valid on condition of numbering the traces so as to be able to record the depth of the tool in the drilling well and the emitter-receiver pair which has given rise to each trace.

In reality, the original traces are not as distinct as those shown in FIGS. 2a to 2d but include a succession of peaks and of troughs which are not directly representative of the energy. To take these events into account, the envelope of the traces is computed; the maxima of said envelope then correspond to the energy maxima. The envelope is computed by methods known in themselves and for example by means of the analytical signal method.

The velocity analysis applied to the envelopes in the same manner as to the original traces has particular advantages connected with the fact essentially that the velocity analysis can be applied to thicker layers of formation or indeed including higher internal variations of velocity. A larger thickness of formation taken into account by the velocity analysis enables more individual traces to be processed and the signal noise ratio to be considerably improved.

In each of the iso-receiver, iso-emitter or or pluri-receiver processings it is also possible to complete said processing by gathering pairs of traces two-by-two, the new group then containing four traces and not two as previously.

FIG. 8 shows how to produce such a gathering. Assume a first pair L of traces and a second pair $L_1$ of traces of which the acoustic paths involve the layer 15 and are located beneath said layer. Among the pairs of traces relating to the layer 15 and located above said layer, a third pair L' of traces will be gathered at the common end S' with the pair L at the common end S if said ends S and S' are symetrical with respect to the middle plane M of the layer 15. In the same way, the pair $L_1$ will be gathered with the pair $L'_1$ when the ends $S_1$ and $S'_1$ are symmetrical with respect to the middle plane M. By an average of the measurements from associated pairs such as L' with a common end S' and L with the common end S, a measurement free from the effects of the paths in the mud and of the irregularities of the wall of the drilling well is obtained, which measurement is connected with the distance of the common end from the acoustic paths to the middle plane of the layer of interest.

Finally, it is very important to note that, by means of the present invention, the measurement of attenuations combined with the measurement of velocities for the various types of waves enables information to be obtained on the lithologic properties (chemical compositions) of the rocks, sedimentologic, fracturation, contained in fluid and petro-physical parameters (porosity, permeability, compressibility, etc . . . ) to be obtained.

We claim:

1. Method of seismic exploration by acoustic well logging of geologic formations penetrated by a drilled well, said method consisting of
    emitting and receiving various types of acoustic waves by emitting and receiving means arranged in said well, said means defining between them at least two acoustic paths of different length;
    recording, for each emission of a plurality of emissions, the full waveform received by at least one of the receiving means;
    marking, at the instant of the emission, and for each recording, the respective positions of the emitter-receiver pair which has given rise to said recorded trace;
    effecting a velocity analysis of some of said recorded traces to determine an approximate value of the transit time of each type of wave being propagated in said formations, wherein said velocity analysis comprises; adjusting said some of said recorded traces mathematically to account for a range of estimated propogation speeds, said range being estimated based upon the types of geologic formations which might be present;
    wherein on each trace, the approximate values of the transit times so-obtained are plotted so as to locate the said various types of waves which appear in the traces;
    selecting a wave of interest from among the said various types of waves and for each type of wave of interest, selecting an event characteristic of the phase of the wave of interest in the trace, and determining the time corresponding to the appearance of this characteristic event in said trace so as to deduce the actual velocity of propogation of said wave of interest in the geologically formed layers inbetween the emitter-receiver pair which give rise to said trace;
    gathering all the traces in pairs so that in a given pair the two acoustic paths corresponding to the two traces of said pair show a common end located on the same side in the drilled well and a non-common end facing a geologic layer of interest;
    measuring in each pair of traces the difference of the time of arrival of the characteristic event selected for each type of wave of interest and finally, computing, by means of this time difference and of the thickness of said geologic layer, the velocity of propogation of each type of wave if interest in this layer.

2. Method according to claim 1, wherein the velocity analysis is carried out on all the traces recorded on a same receiver and produced by the emission of a same emitter and recorded on all the receivers.

3. Method according to claim 1, wherein the velocity analysis is carried out on all of the traces produced by the emission of a same emitter and recorded on all the receivers.

4. Method according to claim 1, wherein the velocity analysis is carried out on all the traces produced by all the emission recorded on all the receivers.

5. Method according to one of claims 1 to 4, wherein the characteristic event of the phase of the wave of interest is the amplitude maximum of the signal recorded on the trace having a time close-by the approximate time defined from the velocity analysis.

6. Method according to one of claims 1 to 4, wherein the characteristic event of the phase of the wave of interest is the trough in the signal recorded on the trace having a time in the vicinity of the approximate time defined from the velocity analysis.

7. Method according to claim 1, wherein the pairs of traces are gathered two by two, so that for each double pair so constituted, the common end of the two acoustic paths of one pair is symmetrical with respect to the middle plane of the geologic layer of the common end of the two acoustic paths of the other pair.

8. Method according to claim 1, wherein the envelope of the signals of each trace is computed and the velocity analysis is applied to the computed envelopes.

9. Method according to claim 1, wherein the emissions of the acoustic waves are carried out by increasing offset so that the acoustic transit times of said waves in the formations penetrated by the drilled wells are different and increase on going on from one emission to another emission.

10. Method according to claim 1, wherein the acoustic paths of the waves are relatively long to permit measurement of the variation in amplitude of the signals due to the attenuation coefficient of the formations traversed by the drilled well, said attenuation being measured by the ratio of the amplitudes of said signals between two different offset traces.

* * * * *

UNITED STATES PATENT AND TRADEMARK OFFICE
CERTIFICATE OF CORRECTION

PATENT NO. : 4,592,030

DATED : May 27, 1986

INVENTOR(S) : Patricia Arditty et al

It is certified that error appears in the above-identified patent and that said Letters Patent is hereby corrected as shown below:

On the title page assignee should read

-- (73) Assignee: Societe Nationale Elf Aquitaine
Production of Tour Aquitaine,
La Defense, Courbevoie, France --.

Signed and Sealed this

Sixth Day of January, 1987

Attest:

DONALD J. QUIGG

Attesting Officer

Commissioner of Patents and Trademarks